April 12, 1960    E. WILDHABER    2,932,239
FACE HOB AND METHOD OF HOBBING STRAIGHT TOOTH BEVEL GEARS
Filed June 4, 1956    2 Sheets-Sheet 1

INVENTOR:
Ernest Wildhaber

April 12, 1960  E. WILDHABER  2,932,239
FACE HOB AND METHOD OF HOBBING STRAIGHT TOOTH BEVEL GEARS
Filed June 4, 1956  2 Sheets-Sheet 2

INVENTOR:
Ernest Wildhaber

United States Patent Office 2,932,239
Patented Apr. 12, 1960

2,932,239

FACE HOB AND METHOD OF HOBBING STRAIGHT-TOOTH BEVEL GEARS

Ernest Wildhaber, Brighton, N.Y.

Application June 4, 1956, Serial No. 589,053

16 Claims. (Cl. 90—5)

The present invention relates to face hobs and to a method of generating straight-tooth bevel gears therewith.

The face hobs of the character referred to contain a plurality of pairs of cutting edges for cutting opposite sides of the teeth. These pairs are spaced in a circle about the hob axis. In operation a hob is rotated on its axis in timed relation to the rotation of a gear blank, whereby adjacent pairs of cutting edges enter adjacent tooth spaces of the gear blank. In addition a rolling-generating motion is provided.

Hobbing processes of this kind are known for bevel gears with longitudinally curved teeth, namely for spiral bevel gears and for bevel gears with zero spiral angle at the tooth middle.

It must be known that in principle straight-tooth bevel gears should also be feasible by a hobbing method of this kind, as any point of a circle describes a straight line when said circle rolls internally on a circle twice its diameter. In other words, it is known that the hypocycloid is a straight line, if its rolling circle has half the diameter of the circle on which it rolls. However difficulties oppose the broad idea.

Generally the hob describes the tooth surfaces of a crown gear, or of a crown-type gear whose tooth number is practically the same as the tooth number of the basic crown gear corresponding to the gear pair to be cut. The tooth number $N_c$ of this crown gear depends on the tooth numbers $n$, $N$ of the pinion and gear in known manner. On gear pairs with axes at right angles $N_c$ is $$N_c = \sqrt{n^2 + N^2}$$

This number is very rarely an integral number. And it should not only be an integral number, but an even number as well. For the hob should contain a number of pairs of cutting edges equal to one half of $N_c$.

One object of the present invention is to overcome this difficulty. A further object is to devise a hob capable of accurately cutting not only gear pairs of a single specification, but a range of jobs that correspond to basic crown gears having a range of tooth numbers.

Curved-tooth bevel gears require a pair of face hobs for hobbing a pair of gears. A further aim of the invention is to cut a pair of bevel gears accurately with a single hob.

Hob sharpening changes the radial distance of the cutting edges from the hob axis. Curved teeth require individual blade adjustment after sharpening, to bring the cutting edges of the hob back to the original radial distance from the hob axis.

An important object of the invention is to do away with the individual blade adjustment and to employ fixed blades or cutting teeth, which do not have to be adjusted during the hob life. Instead the whole hob is bodily reset to allow for the change in the radial distance of the cutting edges. In accordance with the invention advantage is taken of the fact that with straight teeth exactly the same tooth shape can be cut with hobs of different diameter.

A further aim is to employ a face hob so that it requires a minimum relief in cutting straight-tooth bevel gears.

Still other aims are to provide a method of hobbing straight-tooth bevel gears whose teeth are crowned at their ends; and a method using no special machine, but a machine on which also spiral bevel gears and hypoid gears can be generated.

Other objects will appear in the course of the specification and in the recital of the appended claims.

In the drawings:

Fig. 1 is a fragmentary axial section of a bevel-gear blank shown in engagement with a face hob, illustrative of one embodiment of the present invention. The gear teeth here shown have a constant depth from end to end. Their depth is shown exaggerated here and in Figures 4 and 7.

Figure 1:
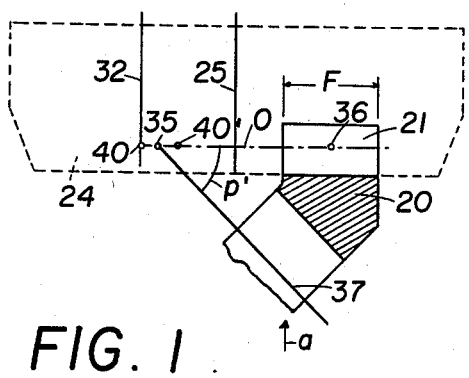
Figure 2:
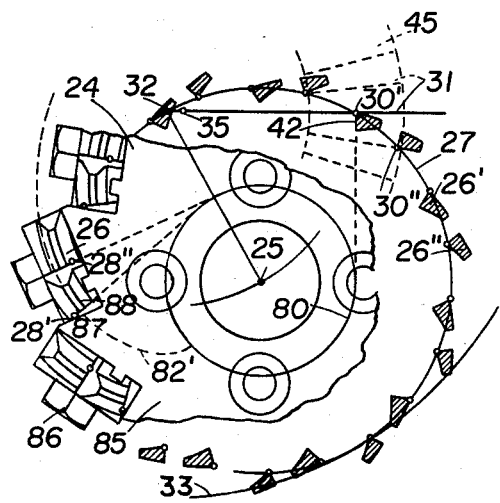
Fig. 2 is partly a front elevational view taken in the direction of arrow $a$ of Fig. 1, and partly a section along pitch plane O.

Figures 1 and 2 refer to hobbing a straight-tooth bevel gear 20 whose teeth 21 have a constant depth from end to end. It has an apex 35 which is the intersection point of the axes of the bevel gear pair. The face hob 24 with axis 25 has cutting teeth or blades 26', 26" arranged in pairs. They extend at an angle to a circle 27 concentric with the hob axis 25. The hob 24 is positioned to describe opposite tooth sides of a reference crown gear or crown-type gear with the outside finish-cutting edges 28' of blades 26' and the inside finish-cutting edges 28" of the blades 26". These cutting edges intersect a mean plane perpendicular to the hob axis, as the pitch plane O of the basic crown gear, at points 30', 30" which lie on circle 27.

The points 30', 30" describe straight radial lines 31 with respect to a plane coinciding with pitch plane O and turning on an axis 32 at half the angular velocity of the face hob. Axis 32 lies on circle 27. This relative motion can be described as a rolling motion of circle 27 centered at 25 on a circle 33 twice its diameter and centered at 32.

Hob 24 describes the tooth sides of a rotating crown gear which turns in the same directional sense at half the angular speed of the hob. The gear blank 20 turns on its axis accordingly, as if rolling on the crown gear. As compared with the crown gear, the gear blank turns at the ratio of the numbers of teeth of the crown gear and of the gear to be cut.

A principal difficulty lies in the number of teeth of the basic crown gear. It is hardly ever an integral number. But it should be integral and double the number of pairs of opposite finish-cutting edges of the hob 24.

In accordance with the invention generation is based on a crown gear or crown-type gear which differs from the basic crown gear enough so as to have an even number of teeth. Its axis 32 is offset from apex 35. The crown gear represented by the face hob has a mean cone distance 40—36 and an even tooth number. The proportion of its tooth number to the tooth number $n$ of gear 20 is equal to the proportion of its cone distance 40—36 to the distance of point 36 from the gear axis 37. Point 36 is a mean pitch point.

Generation based on a crown gear with axis (32) offset from apex 35 is known in connection with reciprocatory tools, without continuous indexing. There, as also here, it results in gear pairs which transmit uniform motion and which have eased-off tooth ends. The ease-off is a very desirable feature, unless overdone. Here the purpose is not ease-off alone, but especially the attainment of the desired even number of teeth of the crown gear.

Eased-off or crowned teeth of a gear pair do not get into full contact over the whole length of the teeth, when run at a light load. In the region towards the tooth ends their teeth have a small separation at their points of closest approach. The separation increases with increasing distance from a mean point (36), about like the square of said distance. It amounts to a separation $z$ at the tooth ends, to be measured in peripheral direction. $z$ depends on the mean cone distance $A=35$—$36$, on the distance $dA=35$—$40$ of apex 35 from axis 32, on the face width F, on the pitch-cone angles $p'$, $p''$ of the gear pair, and on the pressure angle $p_t$ or profile inclination at mean pitch point 36. $p'$ is shown in Fig. 1. $p'$ and $p''$ add up to the shaft angle.

It can be demonstrated mathematically that $z$ can be expressed as $$z=\left(F\frac{dA}{A+dA}\right)^2\frac{\tan p'+\tan p''}{8A\tan p_t}$$

This formula permits to check the ease-off $z$ after assuming $(A+dA)$ so that the crown-type gear has an even number of teeth.

In Fig. 1 the cone distance $(A+dA)=40$—$36$ is shown larger than the cone distance $A=35$—$36$ of the basic crown gear. However it could also be smaller. Thus the axis of the crown gear used for generation could pass through a point 40'. In this case the distance $dA=35$—$40'$ should be introduced as a negative quantity into the above equation for $z$.

A hob designed for a cone distance $(A+dA)$ of the generating crown gear can be used for a range of cone distances $A$ smaller and larger than the given cone distance $(A+dA)$, as much as permitted by an acceptable ease-off $z$. A given hob can be used on a wide range of tooth ratios.

Also the same hob can be used on both members of a gear pair, while gear pairs with teeth curved lengthwise require a pair of hobs for a pair of gears, one hob right hand and the other left hand.

The cutting faces 42 of the cutting teeth 26', 26'' are disposed at the inner end of the blades, at the end which has a smaller distance from the hob axis 25 than the opposite end.

Figures 3, 6:
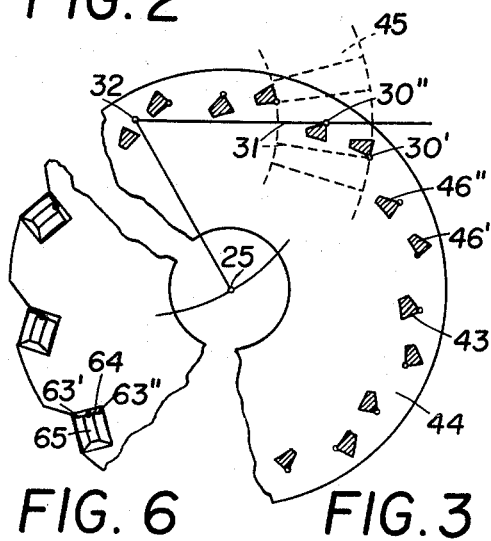
Fig. 3 is a fragmentary section also corresponding to Fig. 1 and taken along pitch plane O, showing a hob cutting in the opposite direction.
Fig. 6 is a fragmentary view of a further hob construction.

Fig. 3 shows a hob 44 with blades 46', 46'' whose cutting faces 43 are arranged at the outer end of the blades. Either arrangement may be used. In each case the pitch points 30', 30'' describe straight radial lines 31 of a crown gear 45 that rotates on its axis 32 at half the angular velocity of the hob. The hob has the same axis 25 in either case.

In operation the face hob is rotated on its axis 25 in time with the rotation of the gear blank 20 on its own axis 37. The velocity ratio is in the proportion of the number of teeth $n$ of gear 20 to the number of pairs of blades. The hob thereby describes the tooth sides of the crown gear 45 with axis 32. In addition the hob is fed about axis 32 while the timing of the gear blank or hob is so changed as if the gear blank would roll on the crown gear 45. In this way the proper gear-tooth surfaces are generated.

Figure 4:
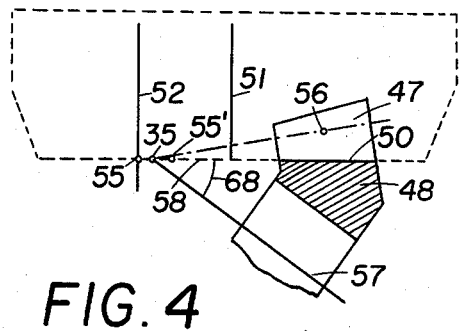
Fig. 4 is an axial section of a bevel-gear blank shown in engagement with a face hob, illustrating a modification in which the gear teeth have a tapering depth.
Figure 5:
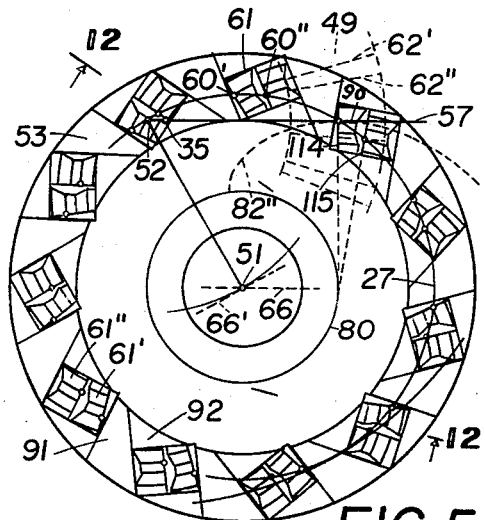
Fig. 5 is a front elevational view corresponding to Fig. 4 and taken in the direction of arrow $a'$, omitting the gear blank.

While Figures 1 to 3 refer to gear teeth 21 of constant depth, Figures 4 and 5 illustrate an application of the method to cutting bevel-gear teeth 47 of tapering depth. The teeth of gear blank 48 have a root line 50 that passes through the gear apex 35. The hob axis 51 is also parallel to the axis 52 of the crown-type gear 49 represented by the hob 53. It is offset from the apex 35 of the gear blank 48. It could also be offset to the opposite side, so that axis 52 would pass through point 55' rather than through point 55. Here again the tooth ratio of the crown-type gear and gear 48 is equal to the proportion of the distances of mean point 56 from axis 52 and from axis 57 of gear 48. It is so selected that the tooth number of the crown-type gear 49 is even.

The crown-type gear is here a nominal crown gear with plane face 58. Its tooth surfaces are radial in the face plane. Accordingly the end points 60', 60'' of the cutting edges of the cutting teeth 61', 61'' describe the radial top edges 62', 62'' of the teeth of said crown-type gear 49. The top edges 62', 62'' stand apart less than half the pitch of the teeth. Likewise the points 60', 60'' describing the top edges of a crown-gear tooth lie closer together on circle 27 than half the spacing of the pairs of points 60', 60''. The two cutting teeth or blades of a pair are here approached to each other, as compared with the showing of Fig. 2, where they are evenly spaced.

It is also possible to further approach the outside and inside finish-cutting edges of a pair until they are located on the same cutting tooth. This is shown in Fig. 6. The edges 63', 63'' which finish opposite tooth sides are formed by the same cutting face 64 on blades 65. This arrangement requires proportionately more depthwise taper than that of the teeth 47 of gear 48 (Fig. 4).

Figure 7:
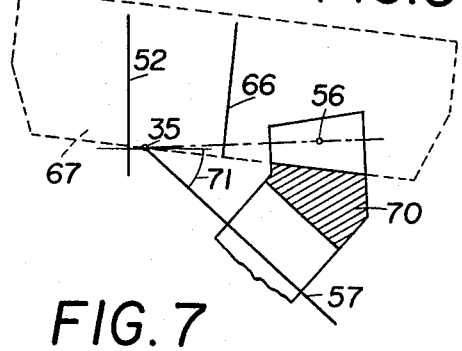
Fig. 7 is a sectional view similar to Fig. 4, indicating a way of controlling ease-off on the tooth profiles by generation.

Generation according to Fig. 1 produces tooth profiles without ease-off at their ends. Generation according to Fig. 4 results in profiles eased off at their ends. The profile ease-off depends on the depthwise taper of the teeth, which increases with decreasing tooth numbers. While profile ease-off is desired, it may turn out too large at low numbers of teeth. If desired, generation may be modified as indicated in Fig. 7, by inclining the axis 66 of hob 67. While in Fig. 4 the gear blank 48 is shown set at its root angle 68 to a plane 58 perpendicular to the axis 52 of the crown-type gear, the gear blank 70 is set to an angle 71 larger than its root angle and smaller than its pitch angle $p'$. This produces a profile ease-off proportional to the angle $p'$—(71).

The hob axis may be tilted so as to show as dotted line 66 in Fig. 5. Other directions of tilt are also feasible, as for instance that defined by line 66' of Fig. 5 and line 66 of Fig. 7.

Fixed blades

Face hobs are sharpened by regrinding the cutting faces of the blades or cutting teeth. As the cutting teeth are inclined to the peripheral direction of the hob and to a circle (27) concentric with the hob, the cutting edges resulting through sharpening are displaced to a different distance from the hob axis. All known face hobs of the character referred to are designed for adjustment of the blades, to set the cutting edges back to their original radial position. This adjustment of the individual blades has to be very accurate, and is time-consuming and costly. Also with the adjustment it is more difficult to hold the blades very rigidly on the hob.

According to my invention such adjustment can be done away with, provided that the blades are suitably designed. In this way a much more practical face hob is achieved.

The underlying principles will now be described with reference to diagram Fig. 8. It is a view along the axis 72 of the crown-type gear represented by a hob with axis 73. Point 74 is the mean point of the face width to be described. It lies on circle 27 that also passes through 72 and is centered on the hob axis 73. As the hob turns on its axis each point of circle 27 describes a straight radial line on the crown-type gear that rotates on its axis 72 at half the angular velocity of the hob. Point 74 of the hob describes radial line 75. 76 is the instantaneous axis of this relative motion. Projected cutting edge 77 is perpendicular to radius 75. The projected cutting tooth extends in the direction of radius 75 at right angles to line 74—76. The latter is its normal.

The same straight line 75 can be described by the point 74 of a different atnd smaller circle 27' centered at 73'. This circle turns on its center 73' at double the turning velocity of the crown-type gear, whereby circle 27' rolls on circle 78' centered at 72. 76' is the instantaneous axis. 77 is again the projected cutting edge. And the projected cutting tooth should extend in direction 75.

Point 74 has a different and smaller distance from center 73' than from center 73, the same radial distance as a point 79 has from center 73. It can be considered a position of point 79 of the cutting tooth of the face hob centered at 73, after the hob has been moved up and turned. The normal 74—76 to the direction of the projected cutting tooth has the same distance from both centers 73 and 73' and is tangent to a circle 80. Accordingly, when center 73' is moved back to 73, together with the cutting tooth and its normal, the normal 81 at 79 is still tangent to circle 80. And the projected cutting tooth extends at right angles to normal 81.

Other positions of center 73 could also be considered. Always the normal to the projected cutting tooth should be tangent to circle 80. The projected cutting tooth is herefore the involute 82 of circle 80, which is the base circle of the involute.

Accordingly a face hob is capable of describing the same straight radial teeth regardless of its changing diameter, if the projected cutting teeth are involutes 82 concentric with the hob axis (73). They should be involutes in a view along the hob axis, or close approximations of these involutes.

The cutting edge (77) should always lie in a plane (81) parallel to the hob axis and tangent to circle 80.

Figure 8:
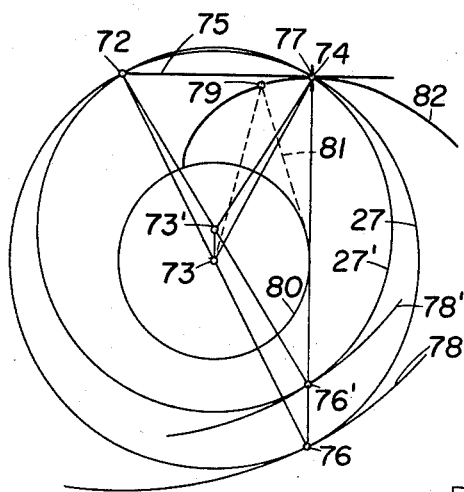
Fig. 8 is a diagram and view along the hob axis, explanatory of the shape required on the blades or cutting teeth so that no individual blade adjustment is required after sharpening.
Figure 9:
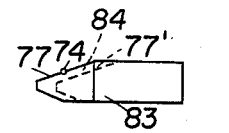
Fig. 9 is a view taken lengthwise of a blade, looking at the cutting face.

The relief of the cutting teeth is not seen in Fig. 8. The relief is in the direction of the hob axis 73. Fig. 9 is a front view of a blade 83, looking at the cutting face with cutting edge 77. The dotted profile 77' will be the cutting edge at a later stage of the hob life. It is displaced in the direction of the hob axis with respect to edge 77.

A relieved side surface 84 can be described by (a) moving a cutting edge (77, Fig. 8) in the direction of normal 74—76 while the hob turns on its axle (73) in proportion to the motion of said edge, as if normal 74—76 moving with said edge would roll on a circle 80 rigid with the hob. In addition (b) the edge is moved relatively to the hob along its axis, for relief. This relieving motion is preferably also in proportion to the other motions.

As the cutting edge (77) is straight, the same surface is described whether this straight line is moved along normal 74—76 or whether it moves in axial direction at a correspondingly larger rate depending on the profile inclination. When the axial relieving motion is added, the result can be considered an axial motion of the straight describing line relatively to the hob, and a proportional turning motion about the hob axis.

It is seen then that the surface thus described is a helical surface of constant lead, having a straight-line profile in planes parallel to the hob axis and tangent to base circle 80. This helical surface would be an involute helicoid were it not for the relief. It may be approximated by an involute helicoid, if desired.

The hobs illustrated in the drawings are of this character. Because the blades are used in the same position on the hob during the entire hob life, the two cutting teeth of a pair can be formed integral with each other. Thus the cutting teeth 26', 26" (Fig. 2) are different parts of an integral cutting portion 26, which because of its larger size can be very rigidly secured to the disk-like body portion 85. A screw 86 may be used for securing.

The involute shape in the axial view is apparent especially on the longitudinal edges of the cutting teeth. Thus edge 87 appears as part of an involute 82' with base circle 80. The opposite edge 88 and all other longitudinal edges are also parts of involutes with base circle 80, in a view along the hob axis.

In Fig. 5 the longitudinal edge 90 appears as part of an involute 82". Likewise all other longitudinal edges of all the cutting teeth 61', 61" appear as parts of involutes, which all have the same base circle 80.

Instead of securing the cutting portions by screws to the body portion of the hob, they may also be brazed or otherwise bonded to the hob body. On small hobs the cutting teeth may be formed integral with the hob body.

Figure 12:
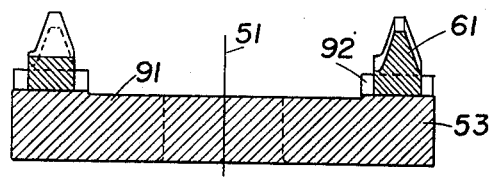
Fig. 12 is a section through a hob taken along planes parallel to the hob axis, along lines 12—12 of Fig. 5.

Figures 5 and 12 show cutting portions 61 brazed or bonded to the hob body 91, each portion containing a pair of cutting teeth 61', 61". To this end the hob body 91 is provided with slots 92. The portions 61 contact the sides of the slots at the front and the rear, so that the main cutting pressure is taken up directly without much stress on the bond. The cutting teeth are finish ground after bonding.

For clarity neither Fig. 12 nor Fig. 9 shows the lengthwise curvature of the blades.

The cutting teeth or blades (61', 61") project from the body portion (91) in the direction of the hob axis 51, or at least in a chiefly axial direction, in all embodiments.

*The hob relief*

A prime requirement is that the cutting teeth are relieved so that their rear clears the crown-gear teeth they describe, and that the side-clearance is at all points of the path equal to or above the minimum required cutting clearance.

Figure 10:
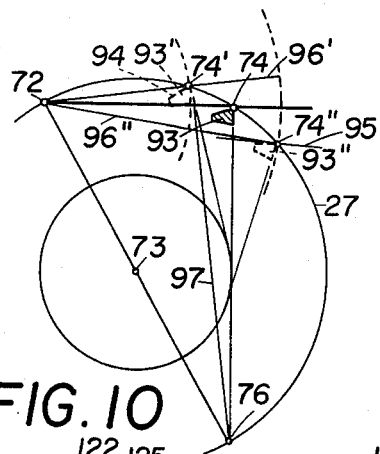
Figures 10 and 11 are diagrams and views along the hob axis, illustrating the minimum relief required on an outside blade and on an inside blade respectively.

Fig. 10 shows the conditions on an outside blade 93, whose finishing edge passes through pitch point 74 on circle 27. The minimum side clearance of the outside relief surface 94 of this blade occurs in the outer end position 93", which is indicated in dotted lines. The tangent 95 to the sectional profile of the blade, at cutting point 74", is inclined from the radial path 96" at least at the minimum required relief angle, after making sure that the rear of the blade does not interfere. The side clearance is larger at the middle position 93 of the blade and at the inner end position 93'. It can be demonstrated that the increase in side clearance between the two end positions is equal to the angle between the radial lines 96', 96" that contain the points 74' and 74" respectively.

This angle can be reduced by increasing the hob diameter. The drawings show a hob diameter kept relatively small to better illustrate the points and to keep the size of the drawing down.

The opposite side of the outside blade 93 should also be provided with sufficient side clearance, although it does no side-cutting. The inside position 93' is here the critical position. The relative motion of the inside corner of blade 93' is peripheral of the instantaneous axis 76 and perpendicular to ray 97. The inside sectional profile of the blade should be in that direction at the corner, or at a clearance angle to it.

Figure 11:
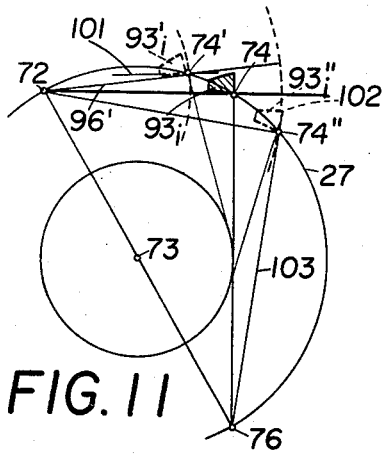

Fig. 11 shows the conditions on an inside blade $93_1$. The critical position of the inside relief surface back of the finishing edge is at the inner end position $93'_1$ of the blade, where the finish-cutting edge passes through point 74'. Its tangent 101 at point 74' is inclined to radial line 96' at least at the minimum permissible cutting-clearance angle. In all cases this angle should be large enough to avoid interference with the rear end of the blade. $93''_1$ is the critical position for the opposite side of the blade. The corner 102 moves at right angles to ray 103.

After the side clearances have been found the axial relief is determined which produces these side clearances or more.

Further considerations should be added especially when cutting from solid metal. Here especially it is not a question only of relief between the hob and the crown gear. The gear blank itself enters into it too.

The hobs rotate in the same directional sense as the crown-type gear they represent. On such hobs a generating roll in the same directional sense as the hob rotation requires additional and more relief than a generating roll in a sense opposite to the hob rotation. Thus if hob 44 of Fig. 3 generates in the up-roll, its clockwise rotation is in an opposite directional sense to the counter-clockwise feed motion about the crown-gear axis 32, and less relief is required than when generating with the same hob in the down-roll. In the up-roll the hob 44 rolls out the tooth spaces of the blank from the inner end to the outer end, in the same direction in which it cuts. Such a direction of roll is preferred, to keep the hob relief down.

Hob 24 of Fig. 2 and hob 53 of Fig. 5 are designed to rotate in counter-clockwise direction, and preferably generate in the down-roll especially when cutting from solid metal. The feed motion about the axis of the crown-type gear is then in a clockwise direction.

Or else these hobs are made of a hand opposite to the hand shown, so that they can be set above center rather than below center. They then rotate in clockwise direction and should preferably generate in the up-roll.

Figure 13:
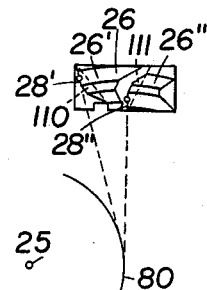
Fig. 13 is an axial view of a cutting portion as shown in Fig. 2, but provided with different cutting faces.

Fig. 13 shows a cutting portion 26 as also shown in Fig. 2. Its cutting teeth 26', 26'' have an outside finish-cutting edge 28' and an inside finish-cutting edge 28'' respectively, the same finish-cutting edges as in Fig. 2. It differs by the position of the cutting faces 110, 111. In Fig. 2 the cutting faces (42) shown are planes parallel to the hob axis (25) and tangent to base circle 80. Likewise the cutting faces 114, 115 shown in Fig. 5 are planes parallel to the hob axis and tangent to base circle 80.

Fig. 13 shows that other cutting faces are also feasible, as long as they produce the same finish-cutting edges. The cutting faces 110, 111 are planes containing the respective cutting edge, and so inclined about it as to provide side rake and simultaneously also front rake. This results in better cutting angles and keener cutting edges. It is applicable to the other cutting portions or blades as well. The cutting edges (28', 28'') still lie in planes parallel to the hob axis and tangent to base circle 80, although the cutting faces differ from such planes.

Figure 14:
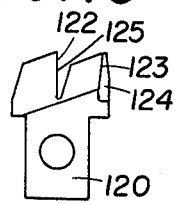
Fig. 14 is a side view of a hob blade having two cutting teeth formed integral with each other.
Figure 15:
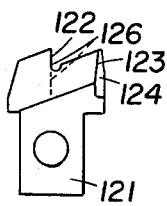
Fig. 15 is a side view of a slightly modified hob blade constructed according to the invention.

Figures 14 and 15 show two different embodiments of blades or cutting portions 120, 121, of which each contains an outside cutting edge 122 and an inside cutting edge 123 formed by different cutting faces. The forward cutting face 124 is identical on both cutting portions 120, 121. The cutting face 125 on portion 120 is one side of a gash, which results in two distinct cutting teeth. Portion 121 has its outside cutting edge 122 formed by a cutting face 126 which follows the edge and does not cut through like a gash. The cutting portions shown are to be secured to the body portion of a face hob, for cutting straight-tooth bevel gears in accordance with the invention.

While the invention has been described in connection with several different embodiments thereof, it will be understood that it is capable of further modification, and this application is intended to cover any variations, uses, or adaptations of the invention following, in general, the principles of the invention and including such departures from the present disclosure as come within the known or customary practice in the art to which the invention pertains and as may be applied to the essential features hereinbefore set forth and as fall within the scope of the invention or the limits of the appended claims.

I claim:

1. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle and being rigid with said hob during its entire life, without provision for individual adjustment after sharpening, and said hob being adjustable bodily after each sharpening to compensate for sharpening and to insure the desired constant shape on the gears produced.

2. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle and containing outside and inside finish-cutting edges, an outside finish-cutting edge and an inside finish-cutting edge being formed on parts integral with each other, and said hob being adjustable bodily after each sharpening to compensate for sharpening and to insure the desired constant shape on the gears produced.

3. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle and being arranged in pairs, one cutting tooth of each pair containing an outside-finish-cutting edge, the other cutting tooth of said pair containing an inside finish-cutting edge, the two cutting teeth of each pair being formed integral with each other so that there is no adjustment between them, and said hob being adjustable bodily after each sharpening to compensate for sharpening and to insure the desired constant shape on the gears produced.

4. A face hob for generating straight-tooth bevel gears which are of constant shape at all stages of the life of the hob, said hob having a disk-like body portion, a plurality of cutting teeth spaced about the axis of said body portion in a circle and projecting from said body portion in a chiefly axial direction, said cutting teeth being laterally inclined to said circle so that the front and rear ends of a cutting tooth have different distances from the axis of said body portion and being relieved and shaped to remain in their original position during the life of the hob, said cutting teeth extending from front to rear along involutes of a circle coaxial with said axis when viewed in the direction of said axis, and said hob being adjustable bodily after each sharpening to compensate for sharpening and to insure the desired constant shape on the gears produced.

5. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle so that the front and rear ends of a cutting tooth have different distances from the axis of said body portion and being relieved and shaped to remain in their original position during the life of the hob, said cutting teeth extending from front to rear along involutes of a base circle coaxial with said axis when viewed in the direction of said axis, finish-cutting edges being formed on said cutting teeth at the intersection of the front faces of said cutting teeth with one side thereof, said cutting edges extending in planes parallel to said axis and tangent to said base circle, and said hob being adjustable bodily after each sharpening to compensate for sharpening and to insure the desired constant shape on the gears produced.

6. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle so that the front and rear ends of a cutting tooth have different distances from said axis, outside and inside finish-cutting edges being formed on said cutting teeth at the intersection of the front faces of said cutting teeth with one side thereof, an outside finish-cutting edge and an inside finish-cutting edge being formed on portions rigidly and permanently connected with each other until used up, and said hob being adjustable bodily after each sharpening to compensate for sharpening and to insure the desired constant shape on the gears produced.

7. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle so that the front and rear ends of a cutting tooth have different distances from said axis, the portions containing said cutting teeth being bonded to said body portion without adjustment thereon, and said hob being adjustable bodily after each sharpening to compensate for sharpening and to insure the desired constant shape on the gears produced.

8. A face hob for generating straight-tooth bevel gears which are of constant shape at all stages of the life of the hob, said hob having a disk-like body portion, a plurality of cutting teeth spaced in a circle about the axis of said body portion and projecting therefrom in a chiefly axial direction, said cutting teeth being laterally inclined to said circle so that the front and rear ends of a cutting tooth have different distances from said axis, slots provided on the face of said body portion, portions integral with said cutting teeth projecting into said slots and contacting at least one side of said slots, said portions being bonded to said body portion without adjustment thereon, and said hob being adjustable bodily after each sharpening to compensate for sharpening and to insure the desired constant shape on the gears produced.

9. The method of generating straight teeth on a bevel gear blank, which comprises rotating a face hob, which has a plurality of side cutting edges spaced at the same distance from its axis of rotation, in engagement with a rotating gear blank while effecting a relative rolling motion between the hob and blank about an axis angularly disposed to the blank axis as though the blank were rolling on a crown-type gear represented by the hob, said rotating of the hob being in timed relation with the blank so that the cutting edges of the hob describe the teeth of the crown-type gear and different cutting edges of the hob enter different tooth spaces of the blank on each revolution of the hob.

10. The method of generating straight teeth on a bevel gear blank according to claim 9 wherein the rolling motion is effected about an axis offset from the apex of the bevel gear blank and corresponding to the axis of said crown-type gear, and said crown-type gear has an even number of teeth, and wherein said hob has a plurality of pairs of opposite side cutting edges for cutting opposite sides, respectively, of the teeth of the blank, the number of said pairs being equal to half the number of teeth of said crown-type gear.

11. The method of generating a pair of straight-tooth bevel gears, which comprises cutting the teeth of each member of the pair by rotating a face hob, which has a plurality of side cutting edges spaced at the same distance from its axis of rotation, in engagement with a rotating gear blank while effecting a relative rolling motion between the hob and blank about an axis angularly disposed to the blank axis and intersecting the blank axis in a point offset from the blank apex as though the blank were rolling on a crown-type gear having an even number of teeth and having an axis coinciding with said offset axis, said rotating of the hob being in timed relation with the blank so that the cutting edges of the hob describe the teeth of the crown-type gear and different cutting edges of the hob enter different tooth spaces of the blank on each revolution of the hob, the amount of offset of said offset axis from the apex of the blank and the number of teeth of the crown-type gear being the same during cutting of both members of the gear pair.

12. The method of generating a pair of straight-tooth bevel gears according to claim 11 wherein the hob used in cutting each member of the pair has a plurality of pairs of opposite side cutting edges for finish-cutting opposite sides, respectively, of the teeth of the blank, the number of said pairs of cutting edges being equal to half the number of teeth of the crown-type gear.

13. The method of generating straight teeth on a bevel gear blank, which comprises rotating a face hob, which has a plurality of cutting teeth arranged in a circle about its axis and inclined to said circle, in engagement with a rotating gear blank while effecting a relative rolling motion between the hob and blank about an axis angularly disposed to the blank axis as though the blank were rolling on a crown-type gear represented by the hob, said hob teeth having front cutting faces and being sharpened by grinding said front cutting faces back, the cutting teeth of said hob remaining fixed therein but said hob being adjusted bodily after sharpening to compensate for the amount of stock removed from the cutting teeth in the sharpening operation.

14. The method of generating straight teeth on a bevel gear blank which comprises rotating a face hob, which has a plurality of cutting teeth arranged in a circle about its axis and inclined to said circle, in engagement with a rotating gear blank while effecting a relative rolling motion between the hob and blank about a second axis angularly disposed to the blank axis as though the blank were rolling on a rotating crown-type gear represented by the hob, the hob being fed relative to the blank about said second axis, said feed being in clockwise direction when the hob rotates on its axis in counterclockwise direction, and being in counterclockwise direction when said hob rotates on its axis in clockwise direction.

15. The method of generating straight teeth on a bevel gear blank, which comprises rotating a face hob, which has a plurality of side cutting edges arranged in a circle about its axis, in engagement with a bevel gear blank while rotating the blank on its axis and simultaneously effecting a relative rolling motion between the hob and blank about an axis angularly disposed to the blank axis and intersecting the blank axis in a point offset from the blank apex, as though the blank were rolling on a crown-type gear represented by the hob, said rotating of the hob being in timed relation with the blank as though the circle of its cutting edges was rolling on a circle of twice the diameter of the first-named circle and which passes through the point of intersection of said offset axis with the blank axis.

16. The method of generating straight teeth on a bevel gear blank an claimed in claim 15 in which the hob is fed relative to the gear blank about said offset axis during said relative rolling motion, and in which said feed is in clockwise direction when the hob rotates in counterclockwise direction, and is in counterclockwise direction when said hob rotates in clockwise direction.

References Cited in the file of this patent

UNITED STATES PATENTS

| | | |
|---|---|---|
| 757,953 | Newton | Apr. 19, 1904 |
| 2,070,191 | Wildhaber | Feb. 9, 1937 |
| 2,126,004 | Gleason | Aug. 9, 1938 |
| 2,127,779 | Mammano | Aug. 23, 1938 |
| 2,339,375 | Cassel | Jan. 18, 1944 |
| 2,648,894 | Wildhaber | Aug. 18, 1953 |
| 2,766,664 | Ciallie | Oct. 16, 1956 |

FOREIGN PATENTS

| | | |
|---|---|---|
| 126,291 | Great Britain | Sept. 24, 1919 |